May 14, 1929.　　A. G. F. KUROWSKI　　1,712,623
TYPEWRITING MACHINE
Filed April 29, 1924　　2 Sheets-Sheet 1
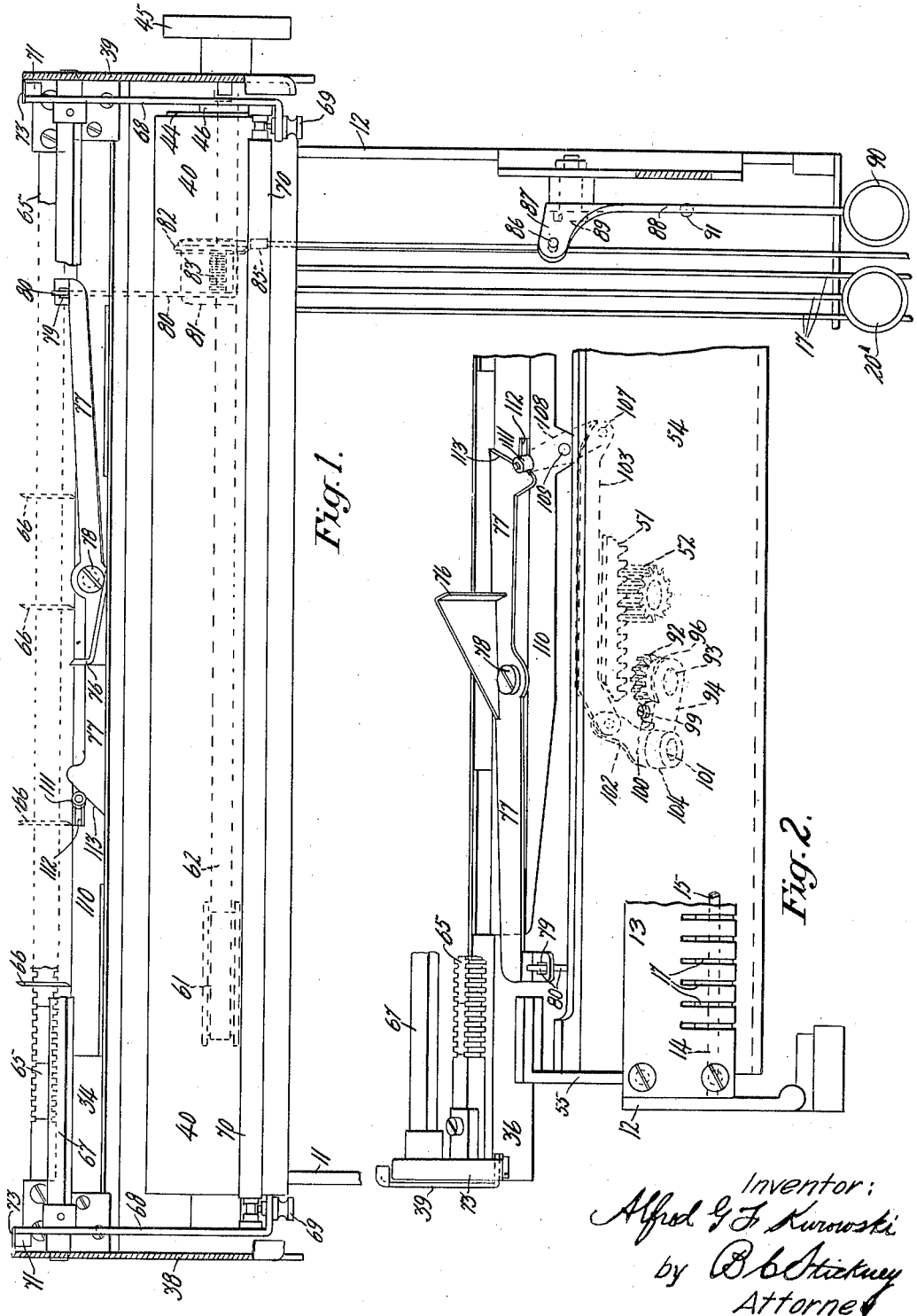

May 14, 1929.  A. G. F. KUROWSKI  1,712,623
TYPEWRITING MACHINE
Filed April 29, 1924  2 Sheets-Sheet 2
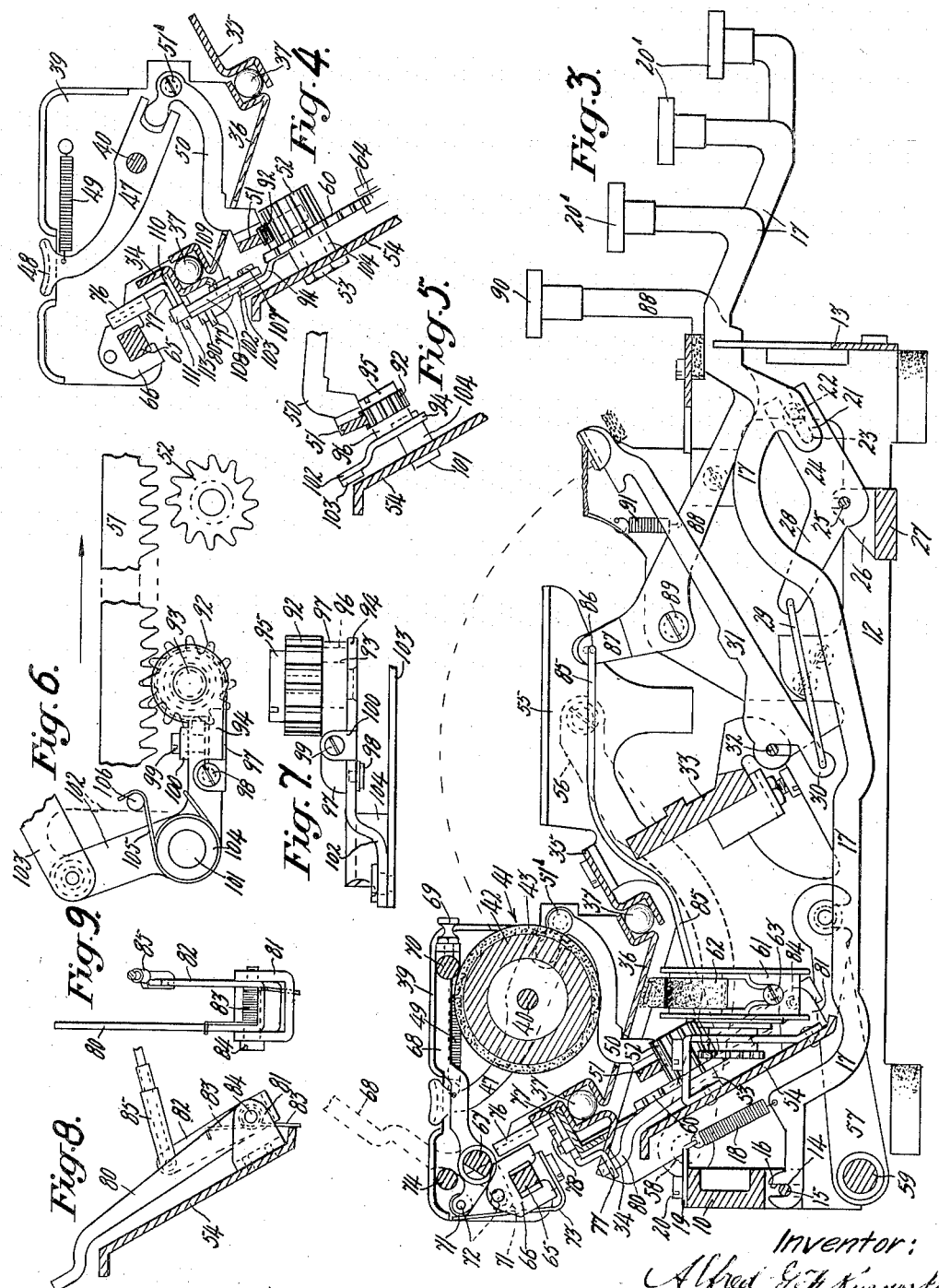
Inventor:
Alfred G. F. Kurowski
by B. C. Stickney
Attorney Patented May 14, 1929.

1,712,623

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Application filed April 29, 1924. Serial No. 709,720.

This invention relates to that class of column-stop devices in which a series of adjustable tabulator-stops on the carriage co-operate with a fixed stop on the frame of the machine.

An object of this invention is to provide a column-stopping mechanism adapted to first release and then arrest the carriage at any columnar position along the line of printing, predetermined by the adustment of a series of column-stops to a scale reading, and then to automatically restore the carriage to its normal carriage-feeding positions.

Another aim is in the provision of an adjustable carriage-retarding element, operative to lift the carriage-feed rack out of engagement with the escapement pinion, release the carriage in a letter-space direction subject to the full power of the carriage motor, and concurrently cause the released carriage to drive the retarding element in such a manner that it acts as a brake or drag to free carriage movement, eliminating violent impact of the movable column-stops against the fixed stop.

Other features and advantages will hereinafter appear.

In the accompanying drawings,

Figure 1 is a plan view of the rear portion of a typewriting machine, a part of the front portion being broken away.

Figure 2 is a rear elevational view of the left-hand side of the machine, also with a portion of the frame and parts broken away.

Figure 3 is a vertical sectional view, taken approximately through the center of the machine.

Figure 4 is a detail sectional view, showing the carriage-releasing and carriage-feeding elements.

Figure 5 is a sectional view, similar to Figure 4, except that the carriage-feeding elements are removed to expose the retarding element.

Figure 6 is an enlarged fragmentary view, showing the retarding element in operative engagement with the carriage-feed rack, as raised out of engagement with the escapement pinion.

Figure 7 is a plan view of the retarding element as shown in Figure 6.

Figures 8 and 9 are respectively side elevational and plan views of the connections to the tabulator-stop.

The frame of the machine comprises a back bar 10, side plates 11 and 12 and a comb 13 at the front, these elements being secured together with screws to form a rectangular carriage-frame.

The back bar 10 has, in its lower edge, a longitudinal groove 14 receptive of a fulcrum-rod 15, and is also slotted transversely to receive the ends of a plurality of key-levers 17, provided with open slots 16 engaging the fulcrum-rod.

To maintain the key-levers on the rod 15, a spring 18 is hooked through a hole in each key-lever, the opposite ends of the springs being secured to a plate 19, extending across the machine, and held to the back bar 10 by one or more screws 20.

The key-levers 17 extend forwardly in an irregular outline from the rod 15 to clear certain parts, presently described, and at their front ends are provided with key-caps 20'. These key-levers are shown as arranged in four banks, and each lever is formed with a lug 21 on the lower side, provided with a pivot stud 22 to engage within a slot 23 formed in one arm of a bell-crank lever 24.

These bell-crank levers are mounted upon a pivot-rod 25 in transverse slots 26 formed in a bar 27 extending across the lower side of the machine and secured at each end to the side plates 11 and 12. The bar 27 has a longitudinal groove through its upper face in which the pivot-wire 25 is seated.

The other arms 28 of the bell-cranks 24 extend toward the rear of the machine and are perforated adjacent their ends to receive wire connections 29 extending rearwardly to engage with the heels 30 of the type-bars 31. The series of type-bars 31 are mounted upon a pivot-rod 32, common to the whole series, and move to and from the printing position through radial slots cut in the segment-plate 33, permanently secured to the frame of the machine.

The rear and front stationary runways, respectively 34 and 35, support the carriage by co-operating with similar but reversed runways formed on the side edges of the carriage-base-plate 36, anti-frictional elements 37 being disposed between adjacent pairs of the runways to provide a free, light-running carriage.

The base-plate 36 extends the entire width of the carriage, and is secured at each end to the carriage end plates 38 and 39, which furnish bearings for the platen-shaft 40, supporting a platen 41 of the usual type having a wooden core 42 and a rubber sheath 43.

The right-hand end of the platen is provided with a head 44 having a hub 46, to which is attached the twirling knob 45. Mounted upon the platen-shaft 40, between the hub 46 and the right-hand end plate 39, is a release lever 47 having at its extending end a finger-piece 48, and being provided with a spring 49 engaging with a stationary stop extending inwardly from the side plate 39 and pulling the release lever 47 in a forward direction.

The forwardly-extending end of the lever 47 is formed with an open slot to engage with the short arm of a bell-crank lever 50, pivoted to the side frame at 51'. This lever 50 extends downwardly and rearwardly, and then at a right angle through a hole in the base-plate 36, the extending end being bent at a right angle to form a support for one end of the carriage-feed rack 51.

A similar bell-crank 50 is pivoted on the left-hand side plate 38, but no release lever is provided. The bell-cranks 50 at the sides of the machine support the carriage-feed rack 51, to which they are adjustably secured.

A pinion 52, co-operating with the rack 51, is rotatably mounted upon a stud 53, fixed in a back plate 54, constituting the rear portion of a shifting frame, which includes the side plates 55, and is suspended within the main frame of the machine from the free ends of levers 56 and 57, the lever 56 being pivoted at 58 on the machine frame, and the lever 57 on a rod 59 extending across the machine between the side plates 11 and 12.

Secured to the rear side of the escapement pinion 52 is an escapement wheel 60 so that the two rotate in unison. A spring-motor 61 is provided with a tape 62 hooked at one end over the head of a screw 63 between the two flanges of the motor-drum 61, and the opposite end of the tape is secured to the base-plate 36 of the carriage. The tension exerted on the tape by the motor is towards the left, facing the front of the machine, in letter-space direction, and, to check the free movement of the motor, the escapement wheel 60 is provided with a holding and stepping dog 64 that constitutes a portion of the carriage-escapement mechanism. A rack-bar 65 is provided with teeth equal to the spacing or pitch of the carriage-feed rack 51, and the spaces may be marked at every fifth division, as is the usual custom.

Adjustable stops 66, having open slots on their under sides, are shaped to interchangeably engage within the tooth-spaces of the bar 65 to denote columnar positions from a scale reading at the front of the platen. These stops, as shown, have beveled edges on opposite faces rendering them reversible to cooperate with the carriage stop, 76.

A rock-shaft 67, journaled in the carriage end plates 38 and 39, has fixed upon it, adjacent its ends, a pair of forwardly-extending arms 68, having their free ends bent at right angles inwardly to provide supports for finger-knobs 69. The forward ends of the arms 68 carry between them a paper-feed roller 70 positioned to contact with the face of the platen 41. The rear ends of the arms 68 are provided with rollers 71 freely rotatable on studs 72, and are positioned relatively to the axis of the rock-shaft 67 to normally stand above it. Flat springs 73, fixed on the carriage, exert pressure against the rollers 71 tending to force the roller 70 against the platen. Conversely, when the roller 70 and the side arms 68 are swung upwardly to the position shown by broken lines in Figure 3, the rollers 71 will pass below the horizontal axis of the rock-shaft 67 and the springs 73 will hold these several parts in the raised position against a fixed tie-rod 74.

As shown, more particularly in Figure 3, the rock-shaft 67 is positioned adjacent the stops 66 when adjusted on the bar 65, and it will be seen that the normal position of the rock-shaft 67 interferes with the removal of the stops 66 from the bar 65, but, when the rock-shaft is partially rotated by raising the arms 68 to the position shown by broken lines, the flat side of the rock-shaft will assume a position parallel with and spaced from the adjacent edges of the stops, in which position the tabulator-stops 66 may be removed or adjusted to new positions on the bar 65, and the frame may then be lowered to its normal position, in which the roller 70 bears against the face of the platen.

To co-operate with these adjustable tabulator-stops 66, a relatively fixed upright stop 76 is arranged upon the frame of the machine, the lower, angular member of the stop being at a right angle and forming part of a lever 77, pivoted on a screw 78 fixed in the carriage. The continuing end of the lever 77 is offset downwardly, its free end having a slot 79 to receive the corresponding free end of a lever 80 disposed interjacently of the back plate 54, and pivoted in a bracket 81 secured to said plate 54.

This lever 80, as shown at Figures 8 and 9, is U-shaped to provide a shorter arm 82, and between these two arms is a torsional spring 83 coiled around a pivot-screw 84 set in the bracket 81, the effect of the spring being to force both arms 80 and 82 toward the rear of the machine.

A spring-clip connection 85 engages in a perforation in the arm 82 and forms a link, the opposite end of which is secured at 86 to the short arm 87 of a key-lever 88, pivoted on a screw 89 threaded into the frame of the machine.

The forward end of this key-lever 88 is provided with a key-cap 90, similar to the other keys of the machine, and constitutes a column-stop or tabulating key, which, as shown in Figure 3, is usually placed in the upper bank of keys, and in this particular instance, as this key-lever does not extend to the rear of the machine, a spring 91 is attached to the lever and hooks through a hole in the frame of the machine, providing means to hold the key in its raised or inoperative position.

As shown more particularly at Figures 6 and 7, the carriage-retarding means comprises a pinion 92, similar in size to the escapement pinion 52, and is mounted to rotate freely upon a stationary bracket 94. To hold this pinion 92 in operative position, the end of a stud 93 is threaded centrally to receive a screw 95, the pinion having a free rotary movement between the head of the screw and the face of the bracket 94. This pinion has a reduced diametral element 96 formed by omitting the teeth to provide a smooth shouldered section between the pinion teeth and the bracket 94.

This element constitutes a drum about which a strap 97 is looped. One of the ends of the strap is secured to the bracket 94 by a screw 98, and the opposite end is bent at a right angle to be engaged by a screw 99 threaded through a lug 100 integral with the bracket 94, the point of the screw bearing against the free end of the strap or band 97.

By this description, it will be understood that the adjustment of the screw controls the pressure of the band 97, and creates friction on the drum element of the pinion 92, determined by the adjustment of the screw.

The bracket 94 forms part of a bell-crank lever, pivoted at 101, upon the shouldered part of a screw threaded into the back plate 54. The arm 102 of the bell-crank bracket is offset, as shown at Figure 5, and its free end is pivotally connected to a link 103. In order to bring the pinion 92 into operative relation with the carriage-feed rack 51, the bell-crank is provided with a hub element 104, around which a helical spring 105 is arranged, so that one end will bear against the bracket 94 and the opposite end hook over a stationary pin 106 fixed on the inner face of the back plate 54. This pin 106 not only retains one end of the spring 105, but when the retarder, composed of elements 92, 94, 96 and associated parts, is in a downward or inoperative position the bracket arm 102, actuated by the spring, assumes a stop position against the pin.

To operate the retarder device, causing it to rock upon its pivot 101 and thus control the velocity of the carriage, the link 103 is connected at 107 to the short arm of a lever 108 pivoted at 109 to a lug forming part of an apron element 110, secured to the rear carriage rail or runway 34. The upper end of the lever 108 carries a pivot upon which a roller 111 is mounted to pass up through an opening 112 in the apron, the roller being engageable with a cam face 113 formed at the extreme end of the lever 77.

From the foregoing it will be understood that when the lever 88 is depressed, the lever 80 will be drawn forward moving the tabulator-lever 77, which, in turn, will move the lever 108, due to contact of the cam 113 with the lever roller 111, and, by reason of the link connections 103, raise the pinion 92 into engagement with the teeth of the rack 51 and elevate the same bodily.

This operation causes disengagement of the escapement pinion 52 from the rack and allows the carriage to move, due to the urge of the spring-motor tape 62, to the left, until the element 76 of the lever 77 makes contact with a tabulator-stop, by which the movement of the carriage will be arrested, whereupon the several springs will restore the mechanism to normal working position when the key-lever is released.

Variations may be resorted to within the scope of the invention, and portions of the improvements may be used without others.

Having thus described my invention, I claim:

1. In a typewriting machine, in combination, a carriage, a rack-bar, an escapement-pinion normally in engagement with the rack-bar, a plurality of tabulator-stops moving with the carriage, a fixed stop, a key for moving said fixed stop into the path of said tabulator-stops, a normally ineffective toothed wheel arranged to be thrown into engagement with the rack-bar and to raise the same out of mesh with the escapement-pinion when the fixed stop is moved into the path of the tabulator-stops, a pivoted lever for supporting said wheel, a brake-drum carried by said wheel, and an adjustable strap held in braking engagement around the drum, one end of said strap being fastened to said lever between the pivot thereof and said wheel.

2. In a typewriting machine having a carriage and an escapement-mechanism, in combination, a governor mechanism for controlling the speed of the carriage when moving leftwardly upon release of said escapement-mechanism, said governor mechanism including a rack floatingly mounted adjacent the rear of said machine, a bell-crank pivoted below and in the rear of said rack and having an outer portion of one arm-member disposed in a plane parallel to the plane of said rack, means including a key for swinging said arm upwardly, a toothed wheel mounted on the outer end of said arm-portion and arranged for rotatably engaging with and for lifting said rack, a drum fast to said wheel and disposed between it and said arm, a brake-strap having one end fastened to said arm between the pivot of the bell-crank and said drum and its remaining portion directed around said drum to be movably disposed above the fixed end portion of the strap, an ear on said arm extending forwardly over the upper end of said brake-strap, and a screw threaded through said ear and engaging the movable portion of said strap for adjusting the friction of the latter on said drum.

3. The combination with a typewriting machine having a tabulator-stop-rack, a plurality of tabulator-stops adjustable thereon, a combined escapement wheel and pinion rotatable on an axis fixed relatively to the machine, an escapement rack-bar rockable relatively to said escapement wheel, and a tabulator key-lever, of a bell-crank bracket pivoted in the machine compactly disposed interponents, including a cam and two lever systems connected by the cam, substantially positioned in two planes, between said tabulator key-lever and one of the arms of said bracket, a toothed wheel revoluble on the other arm of said bracket, said toothed wheel being engageable with said escapement rack-bar and capable of raising the same, a brake drum combined with said wheel, and a brake band for said drum carried by said bracket, the brake band being held in fixed braking engagement with the drum.

4. In a typewriting machine, in combination, a carriage, a rack-bar, an escapement-pinion normally in engagement with the rack-bar, a plurality of tabulator-stops moving with the carriage, a lever including a fixed stop and a cam, a key for actuating said lever to move said fixed stop into the path of said tabulator-stops, a normally ineffective toothed wheel arranged to be thrown into engagement with the rack-bar by the action of said cam and to raise said rack-bar out of engagement with the escapement-pinion when the fixed stop is moved into the path of the tabulator-stops, a brake-drum carried by said wheel, and a brake-strap held in fixed braking engagement with the drum.

5. The combination with a typewriting machine having a carriage, a tabulator-stop-rack, a plurality of tabulator-stops independently adjustable thereon, an escapement wheel, a floatingly mounted escapement rack-bar co-operative with said wheel, and a tabulator key-lever, of a horizontal plate lever pivoted lengthwise in the machine, connections between one end of said lever and said tabulator key-lever, a raised stop on said plate lever suited to contact with any of said adjustable stops, a cam on said plate lever, an upright lever having its upper end engaged by said cam, a bell-crank bracket operably connected to the lower end of said upright lever, means on said bracket for raising said rack-bar out of engagement with said escapement wheel, means for retarding the movement of said rack-bar during its disengagement from the escapement wheel, and means for restoring all of said elements to their normal positions upon release of said tabulator key-lever.

6. The combination with a typewriting machine having a carriage, a tabulator-stop-rack, a plurality of tabulator-stops independently adjustable thereon, an escapement wheel, a floatingly mounted escapement rack-bar co-operative with said wheel, and a tabulator key-lever, of a tabulator lever pivoted in a horizontal plane lengthwise of the machine, a stop fixed on said tabulator lever, a cam on one end of said tabulator lever, combined link and lever connections between said tabulator key-lever and the opposite end of the tabulator lever, whereby said fixed stop may be moved into or out of the path of said tabulator stops, a bracket pivoted below said rack-bar, a toothed wheel revoluble on said bracket and engageable with said rack-bar, adjustable means for retarding the rotation of said toothed wheel, and connections actuated by said cam for rocking said bracket upon its pivot causing engagement of said wheel and rack-bar, and raising said rack-bar out of engagement with said escapement wheel.

7. The combination with a typewriting machine having a carriage, a tabulator-stop-rack, a plurality of tabulator-stops independently adjustable thereon, an escapement wheel, a floatingly mounted escapement rack-bar co-operative with said wheel, and a tabulator key-lever, of a tabulator lever pivoted in a horizontal plane lengthwise of the machine, a stop fixed on said tabulator lever, a cam on one end of said tabulator lever, means actuated by said tabulator key-lever to turn the tabulator lever on its pivot, moving the fixed stop relatively to the path of said tabulator-stops, a bracket pivoted in the machine, a toothed wheel revoluble on said bracket adapted to engage and raise said rack-bar when said bracket is rocked on its pivot, a lever pivoted in a plane transverse to said tabulator lever, a roller carried by the last-named lever to engage said cam, and operative connections between the last-named lever and said pivoted bracket.

8. In a typewriting machine, the combination with a power-driven carriage having a platen and carriage-supports to guide the carriage longitudinally, of a compactly arranged carriage-tabulating mechanism including a rack-bar mounted upon the carriage at the rear of the platen and having vertical column-stops projecting towards the platen, a horizontal stop-lever pivotally mounted to lie flat along one carriage-support to economize in space and having an offset vertical stop-face swingable between the platen and the stop-bar, and a key having connections operative to vibrate said lever and swing the stop-face into the path of a column-stop, said connections including a vertically disposed two-armed U-shaped lever, one arm thereof connected to said stop-lever and the other arm having a connection to the key.

ALFRED G. F. KUROWSKI.